United States Patent [19]
Peaslee et al.

[11] Patent Number: 5,371,849
[45] Date of Patent: Dec. 6, 1994

[54] DUAL HARDWARE CHANNELS AND HARDWARE CONTEXT SWITCHING IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 206,239

[22] Filed: Mar. 4, 1994

Related U.S. Application Data

[63] Continuation of Ser. No. 83,855, Jun. 25, 1993, abandoned, which is a continuation of Ser. No. 582,709, Sep. 14, 1990, abandoned.

[51] Int. Cl.$^5$ .............................................. G06F 15/20
[52] U.S. Cl. .................................. 395/162; 395/163;
395/700; 395/725; 364/230.2; 364/241.2;
364/280.8; 364/281.4; 364/941; 364/941.2;
364/943.92; 364/948.3
[58] Field of Search ............................... 395/162-166,
395/250, 325, 375, 425, 500, 650, 700, 725;
364/230.2, 241.2, 280.8, 281.4, 941, 941.2,
943.92, 948.3

[56] References Cited

U.S. PATENT DOCUMENTS

| | | | |
|---|---|---|---|
| 3,962,684 | 6/1976 | Caudel et al. | 395/325 |
| 4,172,284 | 10/1979 | Heinrich et al. | 364/200 |
| 4,398,244 | 8/1983 | Chu et al. | 395/375 |
| 4,430,707 | 2/1984 | Kim | 395/375 |
| 4,811,205 | 3/1989 | Normington et al. | 395/164 |
| 4,839,800 | 6/1989 | Barlow et al. | 364/200 |
| 4,858,107 | 8/1989 | Fedele | 395/164 |
| 4,862,392 | 8/1989 | Steiner | 395/127 |
| 4,916,301 | 4/1990 | Mansfield et al. | 395/163 |
| 4,928,247 | 5/1990 | Doyle et al. | 395/160 |
| 4,958,303 | 9/1990 | Assarpour et al. | 395/164 |
| 5,010,515 | 4/1991 | Torborg, Jr. | 395/250 |
| 5,127,098 | 6/1992 | Rosenthal et al. | 395/650 |
| 5,138,702 | 8/1992 | Tada | 395/162 |

*Primary Examiner*—Arthur G. Evans
*Assistant Examiner*—Kee M. Tung
*Attorney, Agent, or Firm*—W. K. Denson-Low

[57] ABSTRACT

An improved graphics processor has rapid response to higher priority tasks. It is implemented with multiple channels of FIFO input circuits and with task interrupt and context switching capability. The graphics processor servicing a first channel task is interrupted when a higher priority task is available in a second channel. Context switching facilitates interrupting of the lower priority first channel task, then saving of the context of the first channel task, then performing higher priority second channel task, then restoring the interrupted first channel task, and then continuing with the processing of the restored first channel task. It is also implemented with concurrent downloading from a host computer and processing by the graphics processor and implemented with general purpose graphics processing capability, including multi-level nested interrupts and nested subroutines.

10 Claims, 7 Drawing Sheets

DUAL HARDWARE CHANNELS AND HARDWARE CONTEXT SWITCHING IN A GRAPHICS RENDERING PROCESSOR

This is a continuation of application Ser. No. 08/083,855 filed Jun. 25, 1993, now abandoned, which is a continuation of application Ser. No. 07/582,709, filed Sep. 14, 1990, now abandoned.

CROSS REFERENCE TO RELATED APPLICATIONS

The present application is related to contemporaneously filed patent applications: Ser. No. 07/582,697 filed on Sep. 14, 1990, now U.S. Pat. No. 5,276,798, entitled, "Multifunction High Performance Graphics Rendering Processor," Ser. No. 07/582,696 filed on Sep. 14, 1990, now U.S. Pat. No. 5,255,360, entitled "Dual Programmable Block Texturing and Complex Clipping in a Graphics Processor," Ser. No. 07/582,710 filed on Sep. 14, 1990, now abandoned, entitled "Concurrent General Purpose and DMA Processing in a Graphics Rendering Processor," Ser. No. 07/582,728 filed on Sep. 14, 1990, now U.S. Pat. No. 5,303,321, entitled "Integrated Area Fill, Conics and Vector Generator in a Graphics Processor", Ser. No. 07/582,694 filed on Sep. 14, 1990, now U.S. Pat. No. 5,218,674, entitled "Hardware Bit Block Transfer Processor," Ser. No. 07/582,693 filed on Sep. 14, 1990, now abandoned, entitled "Hardware Symbology and Text Generator in a Graphics Processor," and Ser. No. 07/582,695 filed on Sep. 14, 1990, now U.S. Pat. No. 5,265,203, entitled "Multiprocess Scheduler in a Graphics Processor," all by John M. Peaslee and Jeffrey C. Malacarne, whose teachings are incorporated herein by reference.

BACKGROUND

The field of the invention is display systems and in particular graphics processors for display systems that provide multiple channels and context switching between channels.

Many types of graphics systems require fast response to operator inputs and cursor movements. Often, a fast response must occur while a graphics processor is performing a low priority task, such as generating a background map. Existing graphics processors are implemented with a single channel that cannot respond rapidly to priority tasks. Such systems have relatively poor response to higher priority tasks. This is because the graphics processor is implemented to finish the current task before invoking a next task. There is no provision for assigning priorities to tasks. This is because, even if a subsequent task is a higher priority task, the graphics processor must complete the current task before invoking the higher priority task.

SUMMARY OF THE INVENTION

A prioritized multiple channel configuration having context switching solves important graphic system problem of fast response. The present invention is an improvement in graphics processors, using multiple channels having context switching and FIFOs to provide rapid response to higher priority tasks. A graphics processor servicing a first channel task is interrupted when a higher priority task is available in a second channel. Context switching facilitates interrupting of the lower priority first channel task, then saving of the context of the first channel task, then performing higher priority second channel task, then restoring the interrupted first channel task, and then continuing with the processing of the restored first channel task.

The present invention efficiently solves the problem by providing two prioritized input channels sharing a single graphics processor. The graphics tasks requiring fast update are usually sent through the higher priority channel. The graphics tasks not requiring fast update are usually sent through the low priority channel. Also, multiple host processors are readily accommodated and can each use both channels.

A preferred embodiment of the present invention comprises one or a plurality of stored program computers for generating a plurality of display lists. Each display list includes a plurality of graphics instructions. A plurality of FIFOs are coupled to the one or more stored program computers for storing the plurality of display lists. A graphics processor is coupled to the plurality of FIFOs for generating graphics pixel signals in response to the plurality of display lists stored by the plurality of FIFOs. A bit map memory is coupled to the graphics processor for storing the graphics pixel signals. A display monitor is coupled to the bit map memory for generating a display in response to the graphic pixel signals stored by the bit map memory. The plurality of FIFOs may each store a different display list.

The graphics processor the present invention includes a context switching circuit for switching context between different display lists stored by different ones of the plurality of FIFOs and for generating the graphic pixel signals in response to the different display lists. It also includes an interrupt input circuit for generating an interrupt signal and an interrupt execution circuit coupled to the interrupt input circuit and to the plurality of FIFOs for interrupting the generation of graphic pixel signals in response to the interrupt signal and in response to a first display list stored by the plurality of FIFOs.

The interrupt input circuit generates graphic pixel signals in response to the interrupt signal and in response to a second display list stored by the plurality of FIFOs. It includes a restore control circuit coupled to the interrupt execution circuit for generating a restore signal in response to the second display list stored by the plurality of FIFOs and includes a restore execution circuit coupled to the restore control circuit and to the interrupt execution circuit for restoring the context of the first display list in response to the restore signal. It also includes a concurrent processing circuit coupled to the plurality of FIFOs for processing at least one of the plurality of display lists concurrently with the generating of the display list generated by the stored program computer. It also includes a nested subroutine circuit for controlling the generating of the graphic pixel signals under nested subroutine control.

In addition, a method of providing context switching in a display system comprising a FIFO and a graphics processor is disclosed. The method comprises the following steps. Transferring a first display list to the FIFO. Initiating processing of the first display list by the graphics processor. Transferring a second display list to the FIFO. Interrupting processing of the first display list by the graphics processor and storing a context of the first display list. Initiating processing of the second display list by the graphics processor. Detecting completion of processing of the second display list by the graphics processor. Restoring the context of the first display list. Continuing processing of the first display list by the graphics processor.

Accordingly, a feature of the present invention is to provide an improved display system and method. Another feature of the present invention is to provide an improved graphics processor. Another feature of the present invention is to provide a general purpose graphics processor. Another feature of the present invention is to provide multi-level nested interrupt capability for a graphics processor. Another feature of the present invention is to provide a nested subroutine capability for a graphics processor. Another feature of the present invention is to reduce latency time of a graphics processor. Another feature of the present invention is to provide concurrent downloading and graphics processing. Another feature of the present invention is to provide DMA downloading of display lists. Another feature of the present invention is to provide a multiple channel graphics processor. Another feature of the present invention is to provide a multiple channel FIFO input for a graphics processor. Another feature of the present invention is a context switching interrupt structure to facilitate higher priority processing.

BRIEF DESCRIPTION OF THE DRAWINGS

The various features and advantages of the present invention will become apparent from the following detailed description taken in conjunction with the accompanying drawings, wherein like references numerals designate like structural elements, and in which.

DETAILED DESCRIPTION

Figure 1:
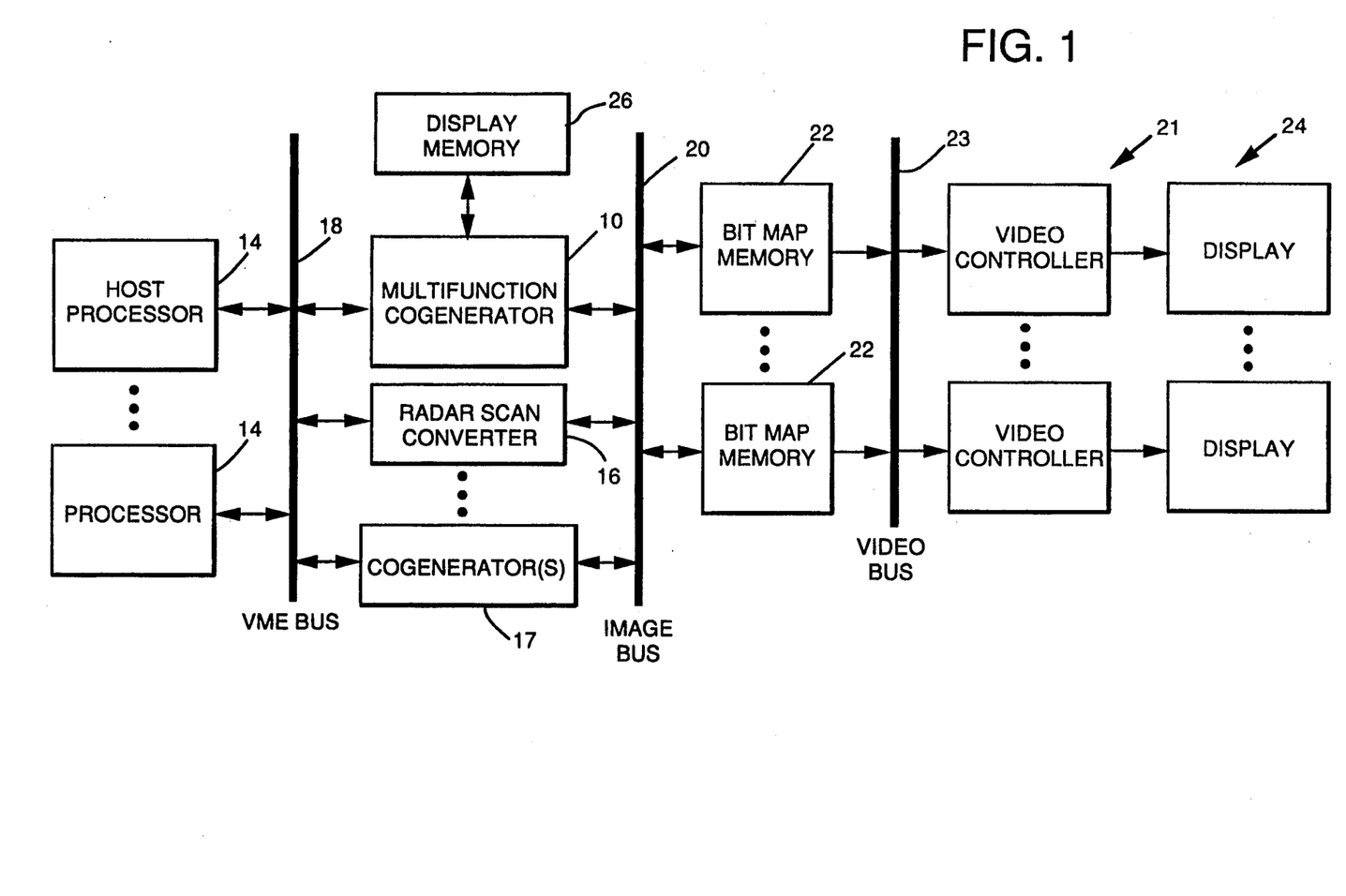
FIG. 1 is a block diagram representation of a graphics processor system that employs dual hardware channels and hardware context switching in accordance with the principles of the present invention.
Figure 2:
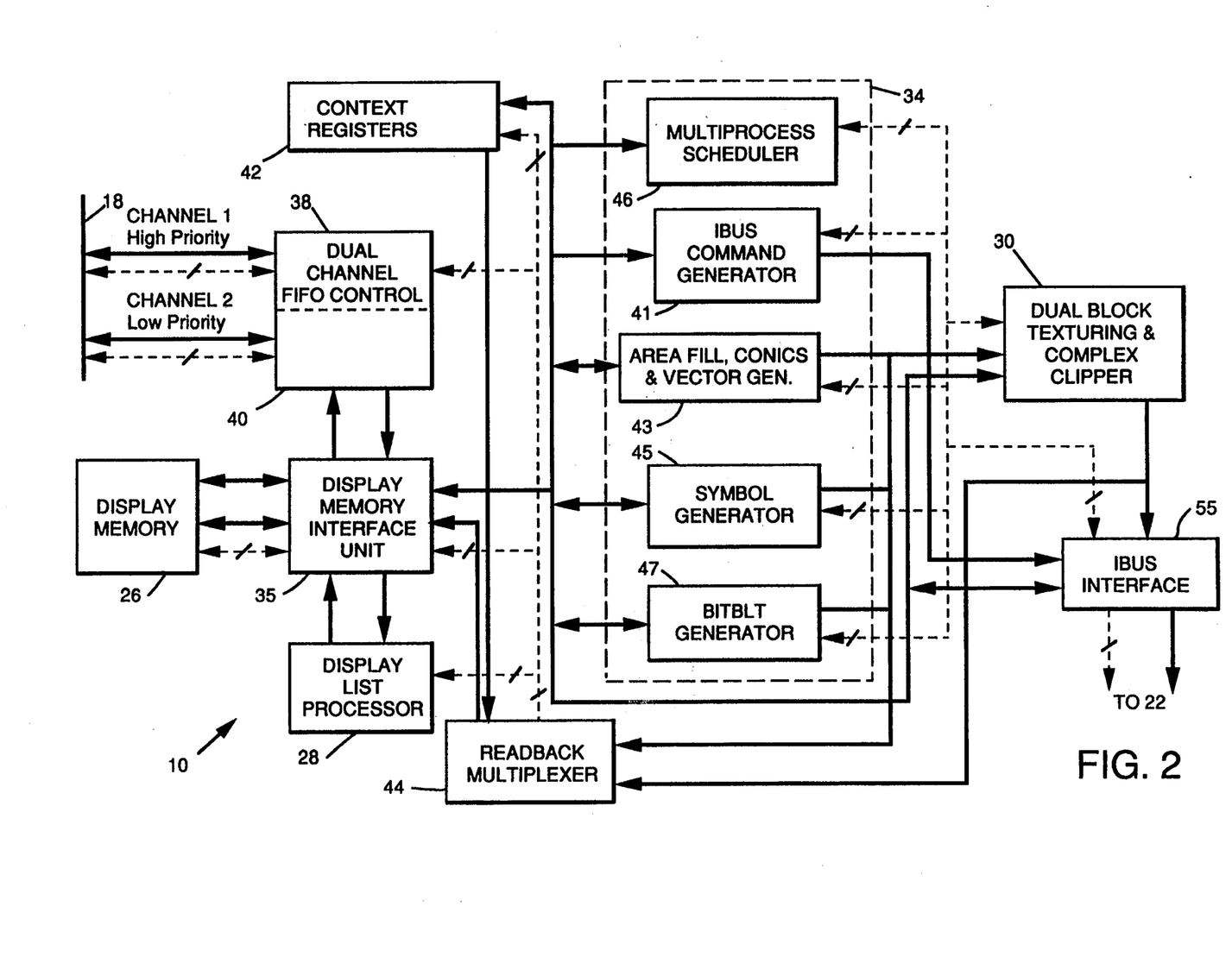
FIG. 2 is a detailed block diagram of the graphics processor of FIG. 1.

Referring to the drawings, FIG. 1 is a block diagram of a generalized graphic display system including a dual channel multifunction cogenerator 10 of which the present invention forms a part. FIG. 2 shows a block diagram of the cogenerator 10 of which a dual channel FIFO controller 38, 40 and context registers 42 of the present invention forms a functionally distinct part. The cogenerator 10 is a dual channel, hardware based device which operates in conjunction with one or more general purpose data processing systems, such as a military command and control system, wherein the simplified system is shown in FIG. 1. Briefly, the system comprises one or more real time data processors 14 and other real time data accumulating devices such as a radar system 16 and other cogenerators 17. The host processor 14 and the radar scan converter 16, for example, feed data into the cogenerator 10 via a mulfifunction bus 18 where it is combined with graphics data generated by the cogenerator 10. The cogenerator 10 outputs a complete set of data for generation of a graphics display via a 64-bit bidirectional interconnect image bus 20 into a bit map memory 22 and then by way of a video bus 23 and video controller 2 to a display system 24. The cogenerator 10 may include various other input devices such as manual input output devices, multiple real time processors, bulk memory devices and the like.

A detailed description of the cogenerator 10 is given in copending commonly assigned U.S. patent application Ser. No. 07/582,697 entitled, "Multifunction Cogenerator," the teachings of which are incorporated herein by reference. In overview, however, the cogenerator 10 is a high performance single chip graphics rendering processor. It generates multiple graphics primitives and performs general purpose processing functions. The cogenerator accepts graphic commands over a thirty-two bit bidirectional host input port from a processor such as the host processor 14 of FIG. 1. The cogenerator 10 processes these commands and then draws into the bit mapped memory 22. The cogenerator 10 "draws" into the bit mapped memory 22 over the image bus 20. "Drawing" is performed by entering binary one and zero signals (drawing ones and drawing zeros herein) into individual memory locations of the bit mapped memory 22. Typically, the bit mapped memory 22 has multiple memory layers with the layers corresponding to color and intensity of graphic display pixels. The image bus 20 is a 64 bit bidirectional multi-user bus. The cogenerator 10 can draw graphic primitives such as symbols, polylines, rectangles, circles, ellipses, arcs, polygon fills, and perform bit block transfers (BITBLT) between the cogenerator 10, the host processor 14, and the bit mapped memory 22.

Directly associated with the cogenerator 10 is a triported display memory 26. The display memory 26 stores all commands and parameters and includes appropriate logic required for the cogenerator 10 to function properly. The memory address space in a working embodiment is 4 megabytes by 32 bits. The cogenerator 10 interfaces with either DRAMS, SRAMS, and/or PROMS. The display memory 26 is accessible by the cogenerator 10 display list processor 28, the cogenerator 10 internal graphics generator 30, and the host processor 14. Stored in the display memory 26 are two first in, first out (FIFO) memory buffers one of the buffers being assigned a higher operational priority than the other and there being one buffer memory for each of two drawing channels. An address stack is provided for each FIFO buffer to store subroutines calls. An attribute stack stores all internal cogenerator attributes for hardware context switching, a sin/cosine table for drawing graphics, and up to 128 font tables to draw stroked and/or dot matrix symbols and characters. A large display list region is also provided.

The display memory 26 is comprised of up to four million words of RAM organized as 32 bit data wore and appropriate buffer logic. The contents of the display memory 26 may be organized as shown in Table I below. The host processor 14 has the ability to perform random reads and writes at any address within the display memory 26 address space. The cogenerator 10 monitors the input of data from the host processor 14 to the display memory 26 to synchronize updating of data from the host processor 14 with the output of graphics signals therefrom.

A dual channel FIFO buffer controller 38, 40 interfaces the cogenerator 10 to the host processor 14. The FIFO buffer controller 38, 40 are responsible for performing all interfacing duties such as proper "hand shaking" when the bus 18 is performing data transfers. The host processor 14 is able to both read and write to the cogenerator 10 and the display memory 26. When the host processor 14 reads or writes to the display memory 26, The FIFO buffer controller 38, 40 actually perform the read or write operations to the display memory 26 for the host processor 14. An address stack is provided internally within each FIFO buffer controller 38, 40 to store subroutine calls, an attributes stack to store all internal attributes required by the cogenerator 10 to perform hardware context switching, a sine/cosine table of drawing conics and primitives, up to 128 font tables to draw both stroked and dot matrix symbols and characters and a large display list region. The FIFO buffer controller 38, 40 is also responsible for arbitrating high and low priority channels to the co-generator 10.

A display memory interface unit 35 performs the actual display memory 26 memory cycles. It is essentially a tri-port memory controller. The display memory 26 is used by both the host processor 14, and the cogenerator 10.

A display list processor 28 performs all of the cogenerator 10 command and display list processing. Commands are set to the cogenerator 10 from the host processor 14. The display list processor 28 handles the various ways that commands can be sent to the cogenerator 10. The display list processor 28 interfaces to the display memory 26 using the display memory interface unit 35, reads commands from the FIFO buffers as well as performs other functions. When a command is given to the display list processor 28, the display list processor 28 processes the command and determines what action to take. The cogenerator 10 provides many different commands and sequences. A more detailed description of the display list processor is given in copending commonly assigned U.S. patent application Ser. No. 07/582,710, now abandoned, entitled "Concurrent General Purpose and DMA Processing in a Graphics Rendering Processor," the teachings of which are incorporated herein by reference.

Context registers 42 store all of the cogenerator attributes. These attributes define the current state of the cogenerator 10. The current state may include a large number of parameters such as: cogenerator operational mode; draw pointer position; foreground color; background color; clipping window dimensions; etc. The contents of the cogenerator 10 are important as they define the personality of the cogenerator 10 at any given time and all attributes are user programmable. This gives a user considerable flexibility in operating the display system.

Also provided is a readback multiplexer 44 which is a large data multiplexer. It is used to multiplex data to the display memory interface unit 35 which is directed to either the display memory 26 or back to the host processor 14 via bus 18. Three sources of readback data are the context registers 42, a graphics generator 34 defied within the dashed block in FIG. 2, and the block texturing and complex clipping processor 30. If the data is intended for the host processor 14 it will be sent through the FIFO buffer controller 38, 40 by the display memory interface unit 35. The graphics generator 34 is connected to the readback multiplexer 44 for various cogenerator 10 drawing operations. The block texturing and complex clipping processor 30 also sends data to the readback multiplexer 44 for various cogenerator 10 operations.

The graphics generator 34 generates all of the cogenerator 10 primitives and symbols and performs bit block transfers (BITBLTs). The graphics generator 34 includes a multiprocessor scheduler 46, a command generator 41, an area fill conic and vector generator 43, a symbol generator 45, and a BITBLT address generator 47. The area fill, conics and vector generator 43 creates digital signals representing graphics primitives such as plylines, rectangles, circles, ellipses and polygons and area fills. These primitive signals are next combined with other digital signals representing alphanumeric and other symbols, which are generated in a symbol generator 45, and with yet a third set of signals generated by block texturing and complex clipping processor 30 to produce the final set of signals which is then transferred by the BITBLT address generator 47 into specified pixel addresses in the bit mapped memory 22. Typically, the bit mapped memory 22 has multipole memory layers which set the color and intensity for the graphics display defined for each pixel location therein.

The multiprocess scheduler 46 controls data transfers between elements of the cogenerator 10. The multiprocess scheduler 46 uses a branched scheduler approach to control the several operations and apply certain characteristics of a software operating system thereto. This promotes functional independence between various cogenerator 10 sequences and provides a mechanism for inter-unit communication.

The area fill, conic and vector generator 43 calculates mathematical solutions for drawing geometric primitives. The symbol generator 45 generates alpha numeric symbols. The BITBLT address generator 47 provides a general purpose mechanism for moving rectangular blocks of image data in the bit map memory 22 and the display memory 26.

Detailed descriptions of the above-described devices are given in copending commonly assigned U.S. patent application Ser. Nos. 07/582,728 now U.S. Pat. No. 5,303,321, entitled "Integrated Area Fill, Conics and Vector Generator in a Graphics Processor", Ser. No. 07/582,604, now U.S. Pat. No. 5,218,674 entitled "Hardware Bit Block Transfer Processor", Ser. No. 07/582,693, now abandoned, entitled "Hardware Symbology and Text Generator in a Graphics Processor", and Ser. No. 07/582,695, now U.S. Pat. No. 5,265,203 entitled "Multiprocess Scheduler in a Graphics Processor," the teachings of which are incorporated herein by reference.

Figure 3:
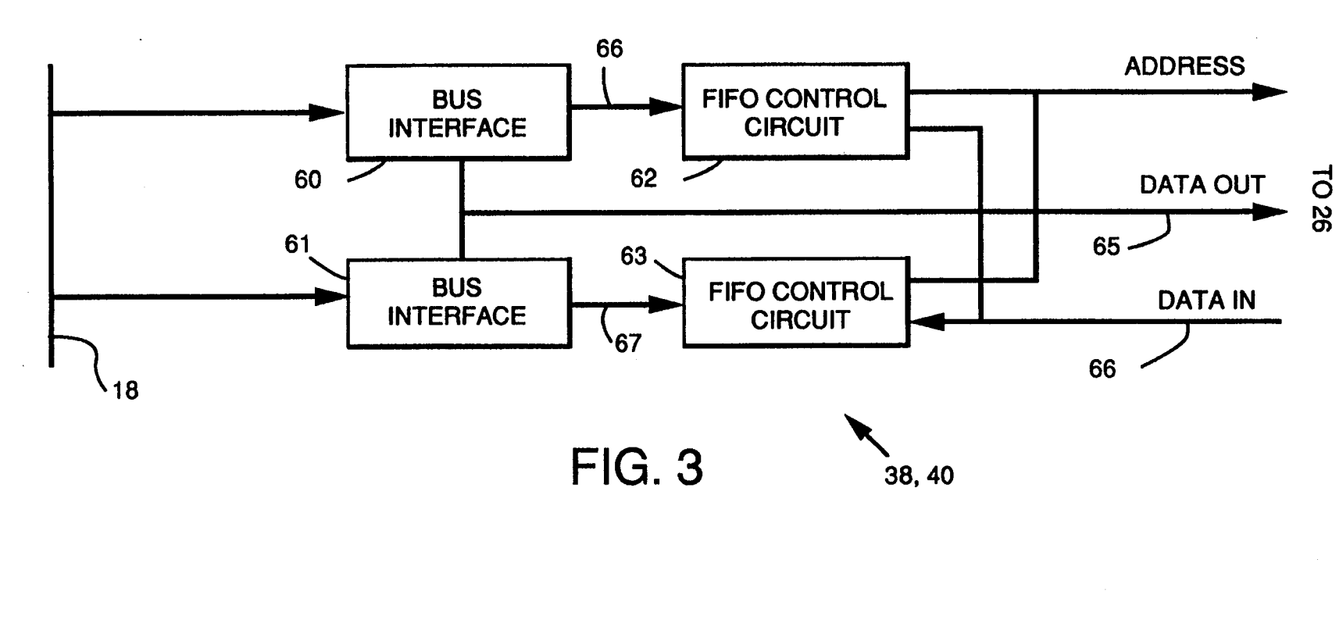
FIG. 3 is a block diagram representation of the interface between the graphics processor and a bus that illustrates aspects of the present invention.

Referring now to FIG. 3, a dual channel FIFO controller 38, 40 couples the display memory interface unit 35 in the graphics cogenerator 10 with the host processor 14 through the multifunction bus 18. A pair of conventional multifunction bus interface circuits 60, 61 couple the graphics processor 10 to the multifunction bus 18. The bus interface circuits 60, 61 are coupled to the display memory interface unit 35 and to dual FIFO control circuits 62, 63. The dual FIFO control circuits 62, 63 are coupled to the display memory interface unit 35.

The dual channel FIFO controller 38, 40 communicates data (instructions and attributes) between the display memory interface unit 35 and the host computer 14. It receives output data from the display memory interface unit 35 on an output data line 65 and communicates this output data through the bus interface circuits 60, 61 to the host processor 14 on the multifunction bus 18. It also receives input data from the host processor 14 on the multifunction bus 18 through the bus interface circuits 60, 61 and communicates this input data to the dual FIFO control circuits 62, 63 on the input data lines, 66, 67. The dual FIFO control circuits 62, 63 implement a conventional FIFO algorithm to load data into the FIFOs.

Figure 4:
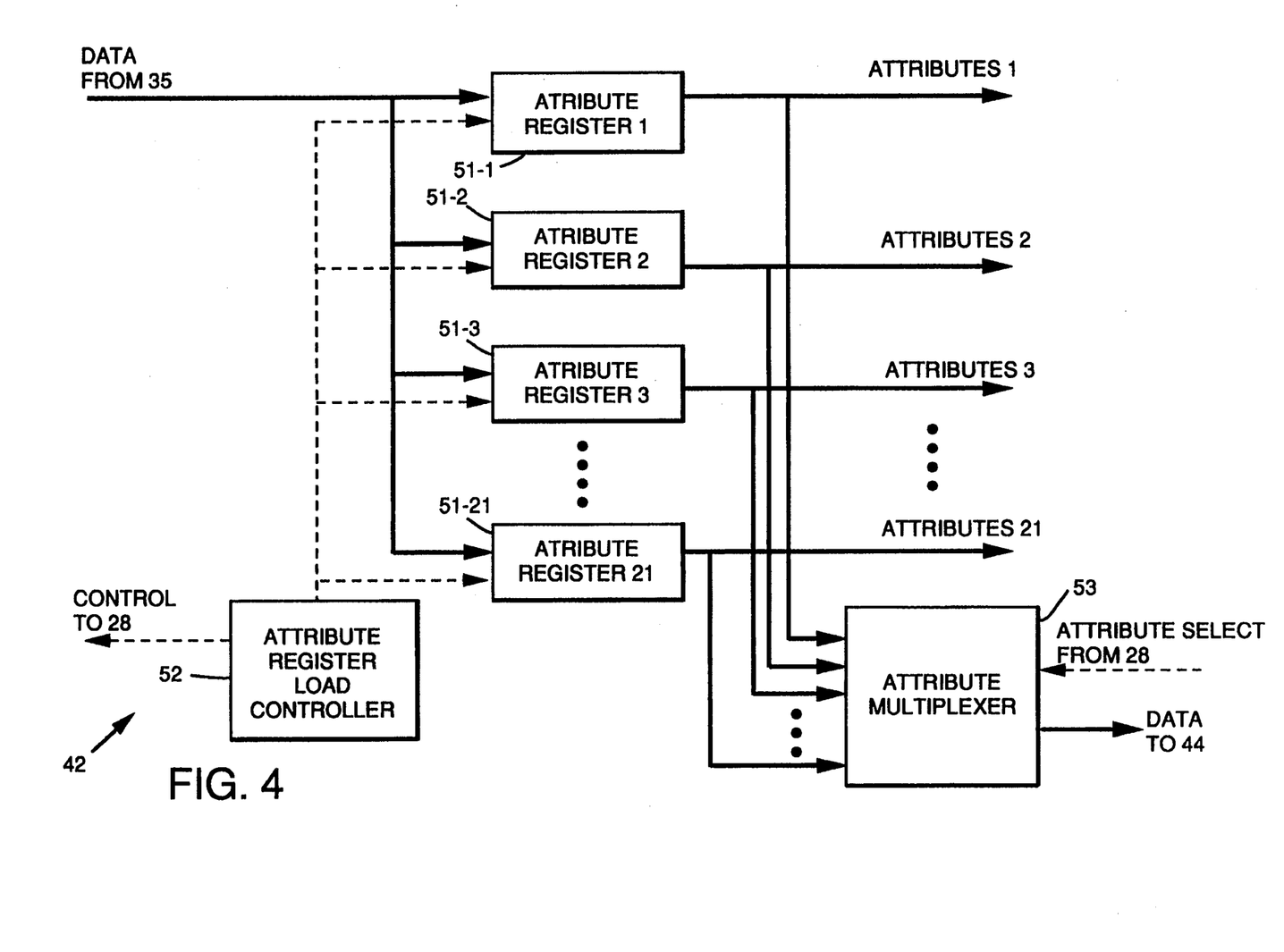
FIG. 4 is a detailed block diagram of the context register shown in FIG. 2.

Referring to FIG. 4, a more detailed block digram of the context registers 42 is shown. The context registers 42 are comprised of 21 attribute registers 51-1 to 51-21, and attribute register load controller 52 and an attribute multiplexer 53. The context registers 42 are coupled to the display memory interface unit 35, to the display list processor 28, and the readback multiplexer 44 as indicated in FIG. 4.

To start a context switch, the cogenerator 10 processes a "PUSH attributes" command. The display list processor 28 reads in a command from the display memory 26. A PUSH command is placed into either the FIFO buffers or a display list. A command decoder (not shown) detects a PUSH command and informs a display list command interpreter (not shown) that selects the attribute data bus input to the readback multiplexer 44. This bus runs from the ontext registers 42 to the readback multiplexer 44 as shown in FIG. 2. The output of the readback multiplexer 44 is sent to the display memory interface unit 35. The display list processor 28 selects the attribute bus for input to the display memory interface unit 35 so all the cogenerator attributes are sequentially loaded into the attribute stack located in the display memory 26. The attribute stack is a 1K block of memory broken up into 32 tables each having 32 entries. Each table holds one cogenerator context, or state, typically with some unused entries.

Once the attribute bus is selected for input to the display memory interface unit 35, the command interpreter in the display list processor 28 sends the attribute select code to the context registers 42. The interpreter cycles through 21 codes to extract all 21 attribute register values out of the context registers 42. This happens sequentially to perform the PUSH operation. The attribute select code connects to the attribute multiplexer 53 in the context registers 42. The first code sent selects attribute register 1 for output. The attribute multiplexer 53 drives the data to the readback multiplexer 44. The first attribute value is at the input to the display memory interface unit 35. The command interpreter in the display list processor 28 controls the attribute stack address generator (not shown).

Figure 5:
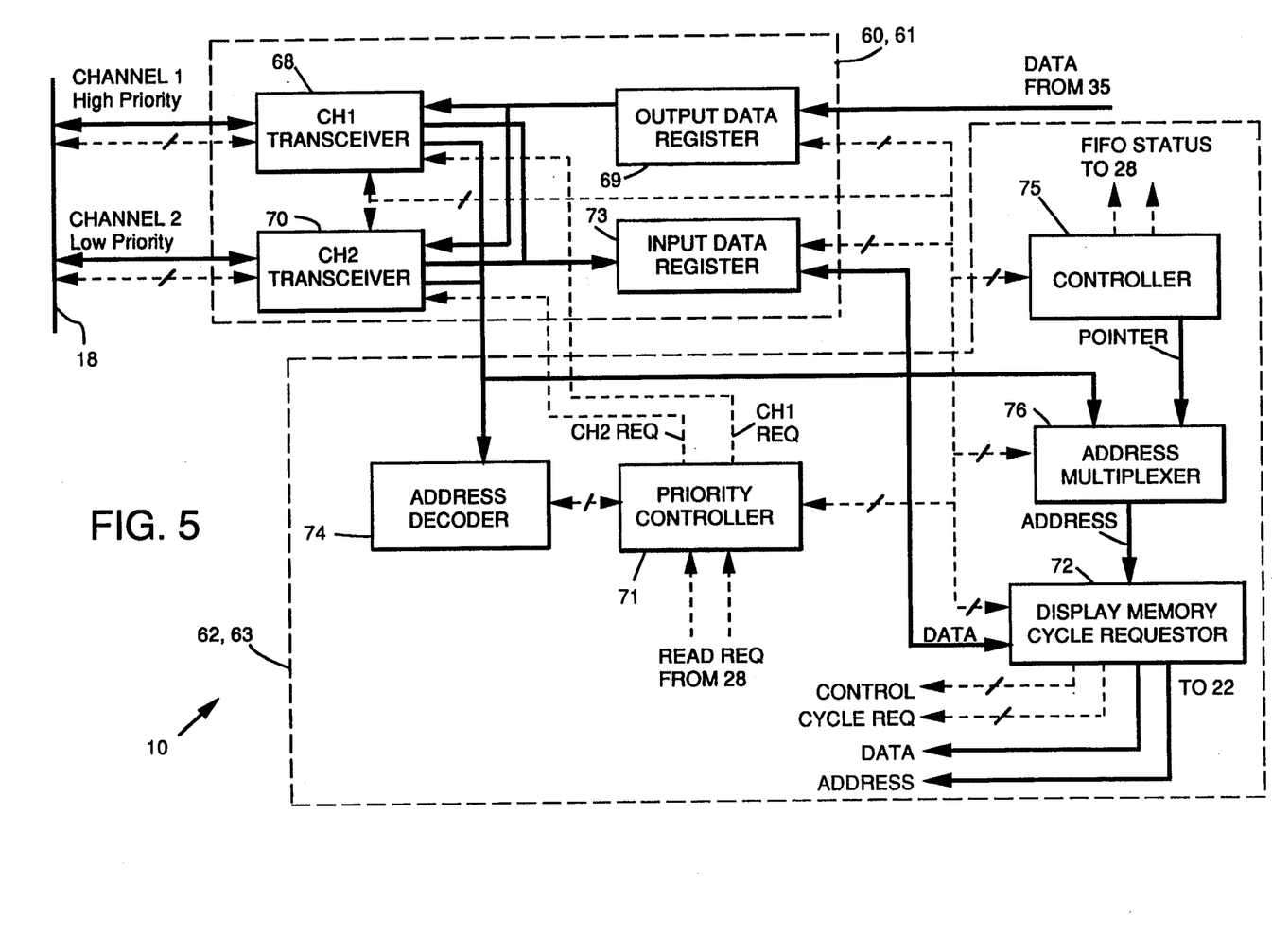
FIG. 5 is a detailed block diagram of the dual channel FIFO controller of FIGS. 2 and 3.

FIG. 5 shows a block diagram of the FIFO controller 38, 40. The dual channel FIFO controller 38, 40 receives a command from the host processor 14. A channel 2 interface transceiver 70 accepts the data, address and provides proper handshaking with the host processor 14 to complete the bus transfer. The channel 2 interface transceiver 70 then activates a channel 2 request. A priority controller 71 monitors both channel 1 request and channel 2 request activity. In this case channel 1 is idle and channel 2 has received a command for FIFO2. The function of the channel 2 interface transceiver 70 is to set priority and determine what kind of memory cycle to perform. When the channel 2 interface transceiver 70 determines the cycle type, it tells the display memory cycle requestor 72 to perform the cycle. The priority controller 71 receives a channel 2 request and loads the input data register 73 with the data sent from the host processor 14. The input data register 73 sends it's contents to the display memory cycle requestor 72. An address decoder 74 decodes the current host processor address. The priority controller 71 uses this information to determine what the host processor 14 is attempting to do. In this case a write to FIFO2 is occurring. The priority controller 71 selects the FIFO2 write pointer from a FIFO controller 75. The priority controller 71 controls an address multiplexer 76 and selects the FIFO2 write pointer. The address multiplexer 76 sends the FIFO2 write pointer value to the display memory cycle requester 72. Now the priority requestor 71 commands the display memory cycle requestor 72 to perform a write cycle to FIFO2. The display memory cycle requestor 72 has the proper address and data. It now issues a cycle request to the display memory interface unit 35. A channel 1 transeiver 65 and output data register 69 are employed.

A memory map of the display memory 26 is shown in Table I. The display memory 26 is implemented with RAM chips having 4 million (4M) 32 bit words. The display memory 26 is accessed with various address registers, FIFO pointers, and stack pointers multiplexed together to form a multi-ported memory. Addresses having 22 bits is sufficient for addressing the 4M word display memory 26. Because many of the addressing circuits have a limited address space, a hardwired block address limiting the programmable bits provides circuit efficiencies. For example, the FIFO 1 pointers addressing words 1024 to 2047 are implemented with a 10 bit programmable address, hardwiring the 11 MSBs (bits 10 to 21) to a zero state and hardwiring the next less significant MSB (bit 9) to a one state. The 32 bit output of the display memory 26 is fanned out to all of the destinations.

In Table I, the memory map of the display memory 26 shows the locations and capacities of the stored information. The term K, as in 1K, means thousands of words of memory and the term M, as in 4M, means millions of words of memory. Memory addresses and memory capacities more than 1K words are often shown herein as being rounded off for convenience of discussion. However, in a preferred embodiment, the rounded off numbers are implemented with binary numbers. For example, 1K implies 1024 and 4K implies 4096.

An unused set of 8 words located at the bottom of the display memory 26 (words 0 to 7) are reserved for future use. An interrupt table having 247 words (words 8 to 255) is located above the unused 8 words at the bottom of the display memory 26 and is used to store interrupt vectors. A pair of subroutine stacks, subroutine stacks 1 and 2, having 256 words (words 256 to 511) and 512 words (words 512 to 1K), respectively, are located above the interrupt table near the bottom of the stack are used to store the return addresses from subroutine calls. Subroutine stack 1 stores return addresses for subroutine calls from channel 1 and subroutine stack 2 stores return addresses for subroutine call from channel 2. A pair of FIFOs, the higher priority FIFO (FIFO 1) and the lower priority FIFO (FIFO 2) having 1K words (words 1K to 2K) and 4K words (words 2K to 6K), respectively, are located above the subroutine stacks. These FIFOs are used to store the input display lists and individual command packets from the host processor 14. An attribute stack having 1K words (words 6K to 7K) is located above the FIFOs and is used to store attributes for context switching. A sine/cosine table having 1K words (words 7K to 8K) is located above the attribute stack and is used for conics rendering. Font tables, 128 tables each having 4K words totaling 512K words (words 8K to 520K), is located above the sine/cosine tables and is used for symbols and text rendering. A display list memory having 3.5M words (words 520K to 4M) is located above the font tables at the top of the display memory 26.

TABLE I

| MEMORY ADDRESS | DATA TYPE |
| --- | --- |
| 4M } 520K | DISPLAY LIST |
| } 8K | FONT TABLE |
| } 7K | SINE/COSINE TABLE |
| } 6K | ATTRIBUTE STACK |
| } 2K | FIFO 2 |
| } 1K | FIFO 1 |
| } 512 | SUBROUTINE STACK 2 |
| } 256 | SUBROUTINE STACK 1 |
| } 8 | INTERRUPT TABLE |
| } 0 | UNUSED |

TABLE II

COGEN DRAW
DRAW POINTER
XY ADDRESS OFFSET VALUE
FOREGROUND COLOR
BACKGROUND COLOR
COLOR MASK
BMM ADDRESS
CLIPPING WINDOW 1
CLIPPING WINDOW 2
CLIPPING WINDOW 3
SYMBOL ATTRIBUTES 1
SYMBOL ATTRIBUTES 2
LINE TEXTURE 1
LINE TEXTURE 2
DEFINE TEXTURE 1
DEFINE TEXTURE 2
DEFINE BITBLT SOURCE BLOCK
ADDR XY SYMBOL STRING POSITION
DDA TEXTURE & POLYLINE STATE
DM_POINTER 1
DM_POINTER 2

Figure 6:
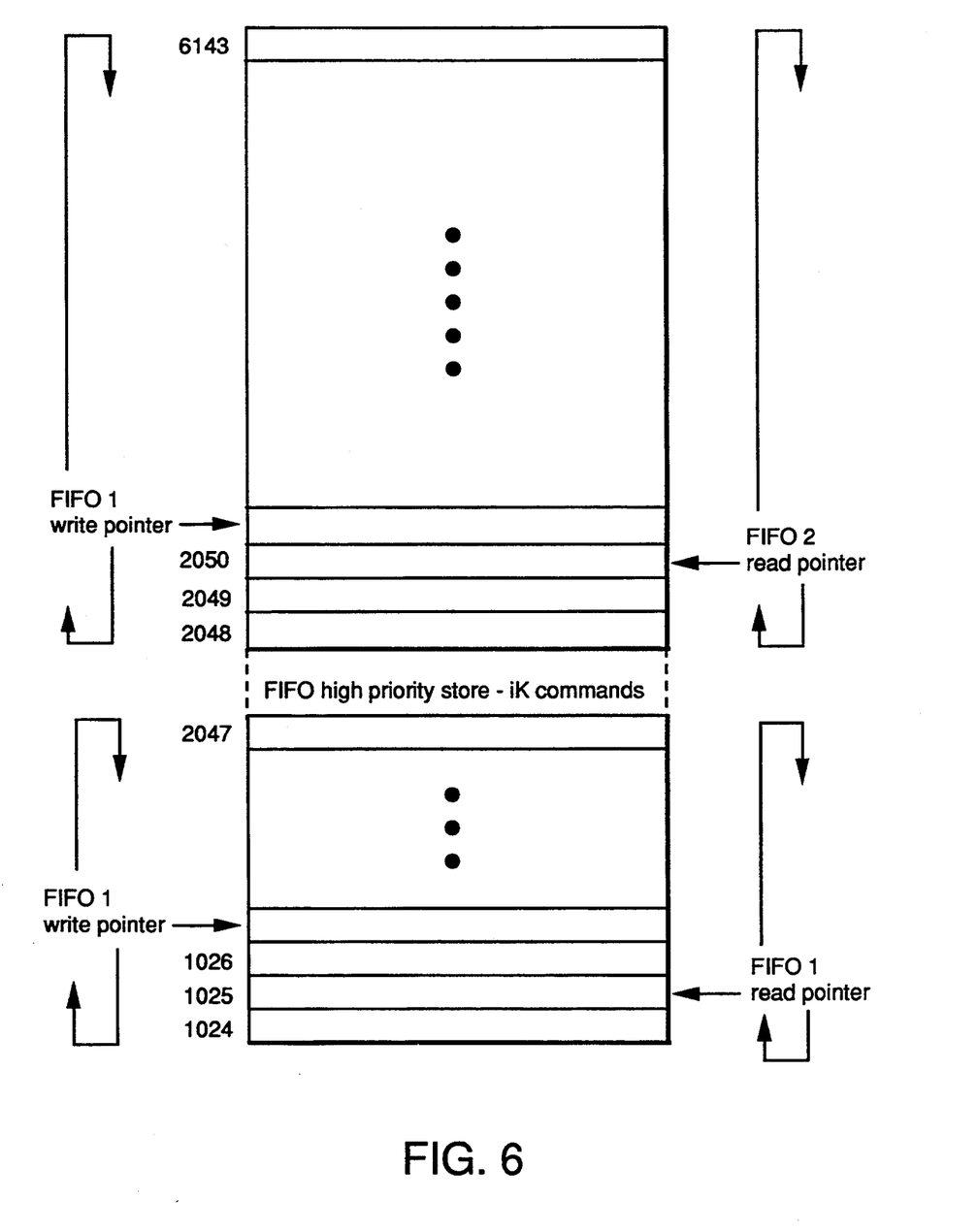
FIG. 6 is a memory map representation of a FIFO.

Referring now to FIG. 6, a FIFO memory map is implemented in the display memory 26 in accordance with Table I. Each FIFO is implemented with a read counter storing a read pointer and a write counter storing a write pointer, contained in the FIFO control circuits 312, 313. The FIFO memory is implemented in the display memory 26 at addresses 1K to 6K. It is implemented in a conventional manner, where the next word to be read is addressed by the read pointer and the next word to be written is addressed by the write pointer. When a word is written, the write pointer is incremented to the next memory write address. When a word is read, the read pointer is incremented to the next memory read address. When the read address or write address gets to the last memory address at the top of the FIFO, memory address 6143 for FIFO 2 and memory address 2047 for FIFO 1, the pointer wraps around to the bottom of the FIFO. memory address 2048 for FIFO 2 and memory address 1024 for FIFO 1.

Because of the wrap around of the pointers, either one of the pointers can catch up with the other pointer. Additional logic is implemented in the FIFO control circuits 312, 313 to interlock FIFO operation in a conventional manner. First, circuitry is provided to insure that the read pointer does not pass the write pointer during a FIFO empty condition. When the read pointer catches up with and equals the write pointer address, processing from this FIFO is disabled until the write pointer is advanced past the read pointer. Second, circuitry is provided to insure that the write pointer does not pass the read pointer during a FIFO full condition. When the write pointer catches up with and equals the read pointer address, loading into this FIFO from the host processor 14 is disabled until the read pointer is advanced past the write pointer. This is implemented by disabling the acknowledge signal on the multifunction bus 18 back to the host computer 14 when the FIFO is full.

Figure 7:
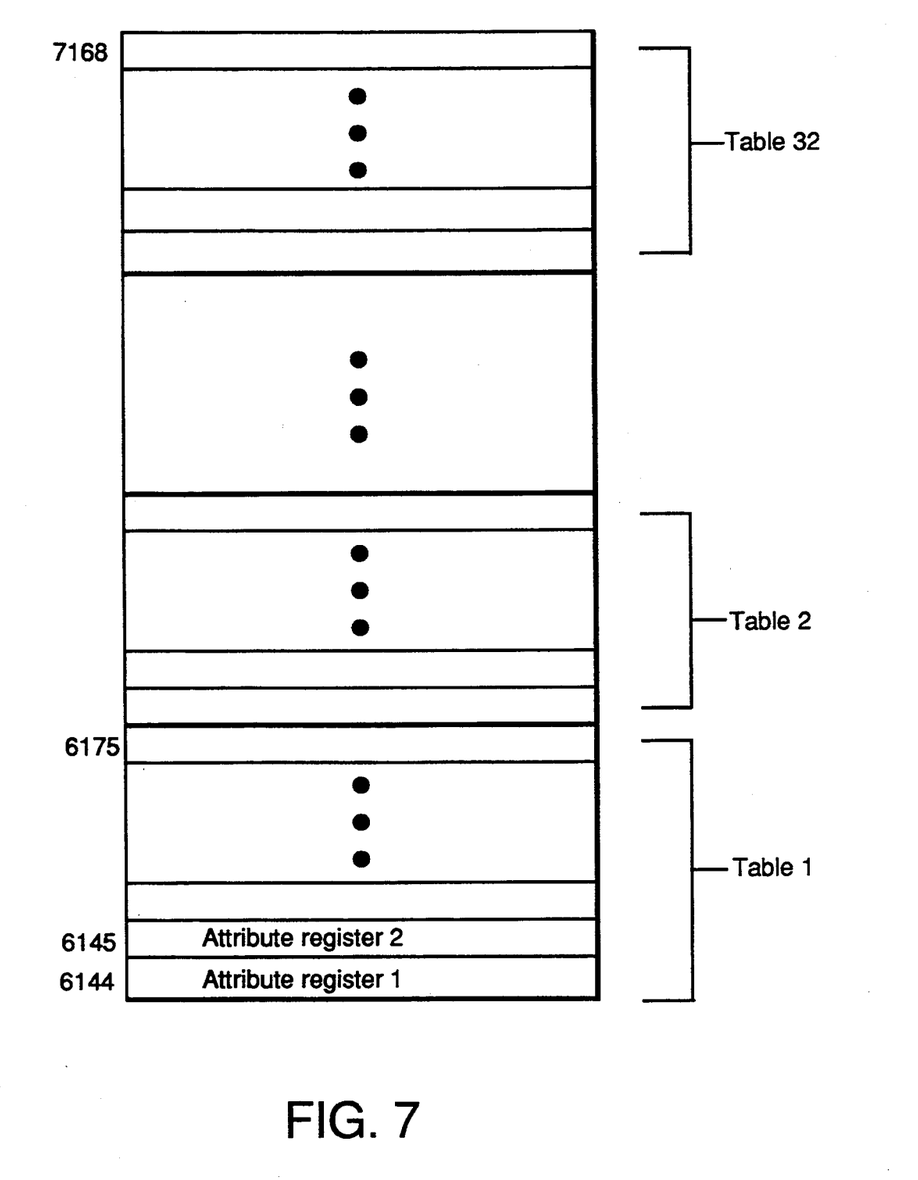
FIG. 7 is a memory map representation of an attribute stack.

Referring now to FIG. 7, an attribute stack is implemented in the display memory 26 in accordance with Table I. The graphics processor 10 is implemented with a comprehensive set of internal attributes. These attributes combine to define the current state of the graphics cogenerator 10. The state of the graphics cogenerator 10 defines the personality of operation. The attribute stack, implemented as a push down stack, allows a programmer to store up to 32 different states each having 21 attributes. The attribute stack pointers and attribute stack control circuitry are implemented to be self contained within the graphics cogenerator 10.

The attribute stack is implemented as a 1K block of memory partitioned into 32 tables, each table having 32 words. Because the system is implemented with 21 attribute registers, each attribute table in the stack can accommodate one full graphic context of 21 attributes and 11 spare words. It is implemented with a counter storing a stack pointer that is incremented through 21 addresses to push a table of attributes into the attribute stack and is decremented 21 addresses to pop a table of attributes out of the attribute stack. The context circuitry is contained in the context register unit. It is implemented in a conventional manner, such as with the interrupt stack in the Motorola 68HC11. Many different attribute sets may be configured. One set of 21 attributes is listed in Table II.

The attributes stored in these registers are pushed into the attribute stack in the display memory 26 in response to an interrupt and are popped out of the attribute stack in the display memory 26 in response to completion of interrupt processing. A RETURN instruction is placed at the end of the interrupting task instruction set to restore the context of the interrupted task for continued processing of the interrupted task. Interrupt implementation is discussed in greater detail in the related patent application entitled "General Purpose and DMA Processing in a Graphics Rendering Processor."

An interrupt vectors the processor operation to a display list in the display list region of the display memory 26. For example, a lower priority display list being processed out of the lower priority FIFO 2 or out of the display list region of display memory 26 may be interrupted by a software interrupt in the higher priority FIFO 1 to process a display list in the display list region. Interrupts are processed when the graphics cogenerator 10 is processing information from the FIFO or from the display list region. An interrupt vectors the processor operation to the display list region. This processing may be implemented to be concurrent with the loading of this display list using the DMA concurrent processing feature discussed in the related patent application entitled "Concurrent General Purpose and DMA processing in a Graphics Rendering Processor." An interrupt automatically stores the return address in an interrupt stack implemented in the display memory interface unit 35.

The context switching capability allows multiple display list routines to be nested. It also allows multiple host processors 14 to download different display list routines to the graphics processor 10 for processing, where each display list routine can have a different context. The display list routines are interrupted with multi-level nested interrupt capability. This permits a second routine to interrupt a first routine that is being processed, a third routine to interrupt the second interrupting routine that is being processed, a forth routine to interrupt the third interrupting routine that is being processed, and so forth. The attributes of each interrupted routine are pushed into the attribute stack to make the attribute registers available for the attributes of the interrupting routine. As interrupting routines are completed, a concluding RETURN instruction in the routine pops the attributes of the last interrupted routine from the attribute stack and execution of the instructions of this last interrupted routine is commenced. This is known as context switching. The attribute stack is 32 levels deep. This allows 32 nested display list subroutines to be used. A push operation sequentially stores all of the attributes stored by the context registers into the attribute stack at the current attribute stack pointer position. The programmer can then overwrite any or all of the internal attributes in the attribute registers. Effectively, this is a nondestructive overwrite operation because the overwritten attributes may be restored with a pop operation from the attribute stack. The pop operation sequentially restores a complete set of 21 attributes from the current attribute stack read pointer location. The subroutine stack facilitates subroutine nesting without context change, implementing up to 256 levels of nesting for channel 1 and up to 512 levels of nesting for channel 2.

The general purpose graphics processing capability, including multi-level nested interrupts and nested subroutines, and the concurrent processing capability are discussed in detail in the related patent application entitled, "Concurrent General Purpose and DMA Processing in a Graphics Rendering Processor."

The nested subroutine features may be used both, within the same channel and across channels. For example, three display list routines A, B and C will be discussed. Initially, the system is executing display list routine-A on channel 2. Then display list routine-B is sent to channel 1. The graphics cogenerator 10 then context switches to channel 1 to process display list routine-B. The current state of the graphics cogenerator 10 for routine-A is pushed onto the attribute stack. Execution of routine-B is then initiated. Routine-B has new attribute which overwrite the routine-A attributes in the context registers. While processing routine-B, routine-C interrupts routine-B on channel 1. The graphics cogenerator 10 then stays on channel 1 to process display list routine-C. This is because channel 2 has a lower priority than channel 1 and hence channel 2 is inhibited from interrupting channel 1 processing. The current state of the graphics cogenerator 10 for routine-B is also pushed onto the attribute stack. Execution of routine-C is then initiated. Routine-C has new attributes which overwrite the routine-B attributes in the context registers. When execution of routine-C is completed, then the graphic processor 10 context switches back to routine-B on channel 1. The attributes of routine-B are popped off of the top of the attribute stack into the context registers. The routine-B attributes overwrite the routine-C attributes in the context registers. The graphics cogenerator 10 then starts processing routine-B from the point where it was interrupted. When execution of routine-B is completed, then the graphics cogenerator 10 context switches back to channel 2, pops the routine-A attributes off of the attribute stack, overwriting the routine-B attributes in the context registers. The graphics cogenerator 10 then starts processing routine-A from the point where it was interrupted. This example shows a simple scenario of context switching and nested interrupts and subroutines.

Many alternative embodiments may be implemented from the teachings herein. For example, the FIFOs may be implemented with dedicated memory in place of the shared display memory 26. Also, the stack may be implemented with dedicated memory in place of the shared display memory 26. Also, multiple channels exceeding two channels, such as three channels or six channels, can readily be implemented. Also, various portions of the system may be implemented with a micro processor, such as a Motorola 68040 or an AND 29000, programmed to implement the system operations. Also, a dedicated data path and a dedicated host processor 14 may be implemented in place of the multifunction bus 18 and a general purpose host processor 14. Also, the graphics system may be implemented for example by a stored program processor or by a special purpose hardwired processor. Stored program processors may be implemented for example by microprocessors, by array processors, or by RISC processors.

Thus there had been described a new and improved graphic display system and method. It is to be understood that the above-described embodiments are illustrative of some of the many specific embodiments that represent applications of the principles of the present invention. Clearly, numerous and varied other arrangements may be designed by those skilled in the art without departing from the scope of the invention.

What is claimed is:

1. A real-time, high speed display system comprising:
   at least one stored program computer for generating a plurality of independent display lists, each display list including a plurality of graphic instructions;
   at least first high priority and second low priority independent First In First Out (FIFO) Buffers for storing a plurality of independent display lists, said at least first high priority and second low priority independent FIFO buffers interfacing with said at least one stored program computer;
   FIFO controller means coupled to said at least first high priority and second low priority independent FIFO buffers; and
   a graphics processor coupled to each of said at least first high priority and second low priority independent FIFO buffers for generating graphic pixel signals in response to said independent display lists received from any of said at least first high priority and second low priority independent FIFO buffers;
   said FIFO controller means comprising means for allowing said at least one stored program computer to utilize said at least first high priority and second low priority independent FIFO buffers and providing real-time, high speed context switching such that a first of said independent display lists having a higher priority will interrupt processing in the graphics processor of a second independent display list having a lower priority, upon said interruption said graphics processor processes said first independent display list having a higher priority, and upon the graphics processor completing processing of said first display list, the context of said second independent display list is restored to said graphics processor and said graphics processor resumes processing said second independent display list.

2. A display system as set forth in claim 1, wherein the graphics processor includes:
an interrupt input circuit for generating an interrupt signal; and
an interrupt execution circuit coupled to said interrupt input circuit and to said at least first high priority and second low priority independent FIFO buffers for interrupting the generating of said graphic pixel signals in response to said interrupt signal and in response to a second independent display list stored by said high priority independent FIFO buffer.

3. A display system as set forth in claim 2, wherein the graphics processor further includes a context memory coupled to said interrupt input circuit for storing the context of a first independent display list in response to said interrupt signal.

4. A display system as set forth in claim 3, wherein the graphics processor further includes a push down stack coupled to said interrupt input circuit for storing the context of a first independent display list in response to said interrupt signal.

5. A display system as set forth in claim 4, wherein the graphics processor further includes:
a restore control circuit coupled to said interrupt execution circuit for generating a restore signal in response to said second independent display list stored by said high priority FIFO buffer; and
a restore execution circuit coupled to said restore control circuit and to said interrupt execution circuit for restoring the context of said first independent display list in response to said restore signal.

6. A display system as set forth in claim 1, wherein the at least one stored program computer includes a plurality of stored program computers each for generating at least one of said plurality of independent display lists and wherein said at least first high priority and second low priority independent FIFO buffers are coupled to said plurality of stored program computers for storing said plurality of independent display lists from said plurality of stored program computers.

7. A display system as set forth in claim 1, wherein said graphics processor includes a concurrent processing circuit coupled to said at least first high priority and second low priority independent FIFO buffers for processing at least one of said plurality of independent display lists concurrent with the generating of said independent display list by said stored program computer.

8. A display system as set forth in claim 1, wherein said graphics processor includes a multi-level nested interrupt circuit for controlling the generating of said graphic pixel signals under multi-level nested interrupt control.

9. A display system as set forth in claim 1, wherein said graphics processor includes a nested subroutine circuit for controlling the generating of said graphic pixel signals under nested subroutine control.

10. A display system as set forth in claim 1, further comprising:
a bit map memory coupled to said graphics processor for storing said graphic pixel signals; and
a display monitor coupled to said bit map memory for generating a display in response to said graphic pixel signals stored by said bit map memory.

* * * * *